E. T. ORNE.
Gas Burner.

No. 27,649. Patented March 27, 1860.

Witnesses:
Thos. R. Roach
Thos. L. Glover

Inventor:
E. T. Orne.

UNITED STATES PATENT OFFICE.

E. T. ORNE, OF BOSTON, MASSACHUSETTS.

GAS-REGULATOR.

Specification of Letters Patent No. 27,649, dated March 27, 1860.

*To all whom it may concern:*

Be it known that I, E. T. ORNE, of Boston, in the county of Suffolk and State of Massachusetts, have invented certain new and useful Improvements in Gas-Regulators, of which the following is a full, clear, and exact description, reference being had to the accompanying drawings, making part of this specification, in which—

Figure 1:
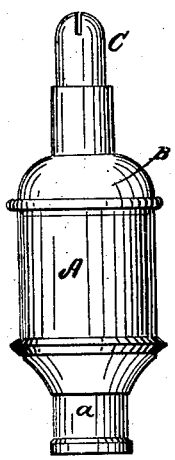
Figure 2:
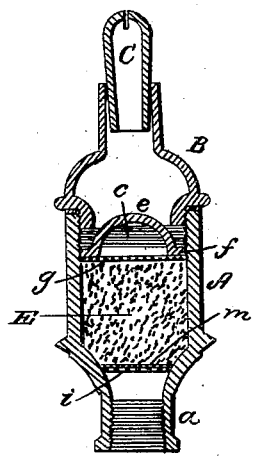
Figure 4:
Figure 3:
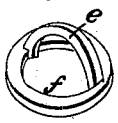
Figure 5:
Figure 6:

Figure 1, is a view of a gas burner with my improvements attached; Fig. 2, is a vertical section through the same; Figs. 3, 4, 5, and 6, details to be hereafter referred to.

Various filtering media (such as wool, woolen felt, hair, and granulated quartz) have been employed in gas burners for the purpose of diffusing the gas before it reached the "tip" and of absorbing the impurities held in suspense by the gas; none of these so far as I am informed have embraced all the requirements of a good filtering medium for a gas burner, and have therefore been objectionable. I will here state the requirements necessary for producing a good burner of this class for regulating the gas: First, it must be cheap and durable in its construction. Second, the filtering medium employed should be a good absorbent of the impurities of the gas, and not easily caked or clogged up by them so as to obstruct the flow of gas; it should be finely divided to diffuse the gas before it reaches the "tip;" it should absorb heat readily from the burner, so that the gas may be quickly warmed and expanded in the burner, and the flame may become steady as soon as possible after ignition; it should be capable of being compressed to prevent "blowing," when the head of gas is strong where the burner is to be used—and be capable of being loosened up to allow the gas to pass more freely when the head of gas in the pipe is so low that a sufficient flame can not be obtained by opening the stop cock to its full extent; it should be such a substance as can be readily obtained by the consumer of gas, so that when it becomes necessary to replenish the filtering material, he may be able to do it without having to send the burner to the manufacturer or mechanic. Third, the burner should be so arranged that when using a filtering medium possessing the properties above enumerated, the required adjustment of the filtering medium, or its removal may be readily effected. These requirements I have attained by my present invention which consists in the employment of sawdust or wood filings as the filtering medium; and in a gas burner of a simple and durable construction, having the required facilities for adjusting the compression of the filtering medium.

That others skilled in the art may understand and use my invention I will proceed to describe the manner in which I have carried out the same.

The burner represented in said drawings consists of a cylindrical body A, which terminates at the lower end in a throat $a$ which screws onto the gas pipe; at the top of this cylinder is cut a female screw $c$ (Fig. 2,) which extends down about half its length, a cap B, fitted to screw into the top of the cylinder, terminates in a tip C. A metal ring $f$ (detached in Fig. 3) has a screw cut on its circumference which fits the screw $c$ in the cylinder, it is furnished with a handle $e$, by which the ring may be turned to screw it up or down in the cylinder. A disk of wire gauze $z$ (detached in Fig. 4) fits on the cylinder under the ring $f$ (or it may be attached to the ring $f$). A disk of perforated metal $i$ (detached in Fig. 5,) fits in the lower part of the burner where it begins to narrow toward the throat $a$, and over this is placed another disk of wire gauze $m$ (detached in Fig. 6). Between the two disks of wire gauze is contained the filtering medium or packing E, of saw dust, which fills about two thirds of the cylinder A. For this purpose I prefer saw dust from pine or other light wood.

The plate $i$ and disk $m$ being in place, the saw dust is placed in the cylinder A where it is sufficiently compressed by the finger or otherwise, the disk $z$ is then placed on it, and the ring $f$ is screwed down tight; the cap B, with its tip C, is then screwed onto the top of the cylinder A, when the burner is ready for use. If the "head of gas" in the pipe is strong, and the burner "blows," the saw dust must be still further compressed by turning down the ring $f$,—if however from any cause the "head" of gas is so much reduced that a sufficient flame is not produced, when the stop cock is entirely open, the burner may be adjusted to suit the pressure of gas, by removing the ring $f$ and disk $z$ and loosening up the saw dust with the point of a pen knife or other suitable instrument.

When after long use the saw dust becomes caked or clogged by the impurities deposited from the gas, it may be readily replaced by the gas consumer himself, as it is a cheap article, attainable by all.

I have found in practice that it may be used without changing for a considerable length of time; its duration however will much depend on the quality of the gas filtered through it.

With a burner arranged as above described I am enabled, when the above mentioned filtering material is employed to regulate the burner to suit the varying pressure or head of gas in the pipe, at the same time that the impurities of the gas are prevented from escaping at the "tip."

What I claim as my invention and desire to secure by Letters Patent, is—

1. The employment of saw dust or wood filings as a filtering medium for gas burners.

2. I claim in combination with the use of said material, the above described burner, consisting essentially of the cylinder A and ring $f$ operating substantially as set forth.

E. T. ORNE.

Witnesses:
 THOS. R. ROACH,
 P. E. TESCHEMACHER.